United States Patent [19]

Ruppman, Sr.

[11] Patent Number: 5,730,914
[45] Date of Patent: Mar. 24, 1998

[54] METHOD OF MAKING A MOLDED PLASTIC CONTAINER

[76] Inventor: Kurt H. Ruppman, Sr., 16105 Longvista, Dallas, Tex. 75248

[21] Appl. No.: 587,282

[22] Filed: Jan. 16, 1996

Related U.S. Application Data

[63] Continuation-in-part of Ser. No. 412,535, Mar. 27, 1995, abandoned.

[51] Int. Cl.$^6$ .................................................... B29C 49/66
[52] U.S. Cl. ........................... 264/28; 264/521; 264/526; 264/528; 264/904; 428/35.7; 428/36.92
[58] Field of Search .......................... 264/28, 520, 521, 264/526, 528, 529, 530, 904; 425/526; 428/35.7, 36.92

[56] References Cited

U.S. PATENT DOCUMENTS

| | | | |
|---|---|---|---|
| 3,783,157 | 1/1974 | Frank | 264/528 |
| 4,039,641 | 8/1977 | Collins | 264/28 |
| 4,385,089 | 5/1983 | Bonnebat et al. | 428/35 |
| 4,512,948 | 4/1985 | Jabarin | 264/521 |
| 4,839,631 | 6/1989 | Ajmera et al. | 264/526 |
| 4,883,631 | 11/1989 | Ajmera | 264/528 |
| 5,035,931 | 7/1991 | Yamada et al. | 428/35.7 |
| 5,182,122 | 1/1993 | Uehara et al. | 425/526 |
| 5,229,043 | 7/1993 | Lee | 264/528 |

FOREIGN PATENT DOCUMENTS

| | | | |
|---|---|---|---|
| 59-093330 | 5/1984 | Japan | 264/904 |
| 59-129125 | 5/1984 | Japan | 264/904 |
| 5-92476 | 4/1993 | Japan | 264/904 |

Primary Examiner—Catherine Timm
Attorney, Agent, or Firm—W. Thomas Timmons; Jeffrey T. Hubbard; Timmons & Kelly

[57] ABSTRACT

A polyethylene terephthalate (PET) preform (11) having a capped cylindrical body (13), a threaded top and a collared neck (19) is preheated to soften the PET. The preform (11) is placed in a split mold (26) whose walls (27,29) are heated to a temperature between 150° C. and 177° C. A stretch rod (35) is inserted through the top of the preform (11), and stretches the preform (11) axially until the preform (11) is the length of the final product (49). The preform (11) is expanded using compressed ambient air, and is molded against the walls (27,29) of the mold (26). The air is vented, and dry nitrogen at a temperature below −50° C. is injected into the molded preform (47) to purge and cool the molded preform (47) while maintaining pressure of at least 520 kPag. The molded preform (47) is held against the mold (26) for a predetermined time, during which the outer and inner surfaces of the molded preform (11) are annealed, and the molded preform (47) transforms into the final product (49). The nitrogen supply is shut off and the final product (49) is released from the mold (26).

5 Claims, 5 Drawing Sheets

METHOD OF MAKING A MOLDED PLASTIC CONTAINER

This application is a continuation-in-part of U.S. Ser. No. 08/412,535, filed Mar. 27, 1995, now expressly abandoned, the disclosure of which is incorporated herein by reference.

BACKGROUND OF THE INVENTION

1. Field of the Invention

The invention relates to methods of making improved thermoplastic materials, and in particular to a method of making a biaxially oriented, heat set molded container from polyethylene terephthalate (PET) or similar thermoplastic polymer, where the container has improved thermomechanical and diffusion properties.

2. Description of Related Art

Organic thermoplastic polymeric plastics such as PET are widely used for making molded containers, thanks to their clarity, impact resistance and dimensional stability. However, carbon dioxide diffuses, or permeates, through PET at a rate that limits the shelf life for carbonated beverages. As a result, inventory that is not sold within a few weeks of manufacture goes "flat" and must be discarded. This is especially true for beer, the taste of which is sensitive to the carbonation level.

A process known as heat setting is used to produce containers that can be filled with hot fluids without shrinking. In this process, amorphous PET is blown into a hot mold, heated above the PET's glass transition temperature, and held at this temperature for a time, followed by slow cooling. The heating causes a significant percentage of the PET to convert from amorphous to crystalline form. Amorphous, or noncrystalline, PET softens and shrinks at temperatures commonly used in the food processing industry. Crystalline PET is an opaque white color and is brittle rather than flexible. However, crystalline PET is strong and retains its shape without shrinking or softening at higher temperatures than amorphous PET. The commercial realizations of the heat setting process are generally complex, require control of heating and cooling rates inferred from a number of measurements, and require more time for a production cycle than cold blowing methods.

U.S. Pat. No. 4,039,641, issued to Collins, discloses a method of manufacturing a heat set plastic container employing a split mold with walls heated to 140° C. While the preferred embodiment uses a liquid to cool the container, an alternate embodiment uses nitrogen gas under pressure, at about ambient temperature, to prevent shrinkage of the container while the mold is cooled to 40° C. The container is held under pressure against the hot mold for 25 seconds while heat setting occurs, followed by cooling the mold to 40° C. The total production time is several times the typical cold molding production cycle time.

U.S. Pat. No. 4,385,089, issued to Bonnebat et al., also teaches a process for heat setting a bottle. No apparatus is disclosed for practicing the process. Instead, Bonnebat stresses keeping the temperature of the molded material between the minimum biaxial orientation temperature and 30° C. to 50° C. above this temperature. The biaxial orientation temperature is defined as the lowest possible temperature which is compatible with achieving stretchability, with a good distribution of the material. For PET, Bonnebat sets the maximum allowable temperature at 120° C. This is within the range of temperatures already used in the industry to preheat a parison, or preform, before beginning the heat setting process. Bonnebat also requires longer cycle times, due mainly to contact time with the mold of 5 to 20 seconds.

Methods have been devised to address the problems of long cycle time and shrinkage of the molded material upon removal from the heated mold. These methods generally utilize a cooling fluid, either liquid or gas. The temperature of the cooling fluid ranges between slightly above ambient temperature down to zero degrees Celsius.

U.S. Pat. No. 4,883,631, issued to Ajmera, discloses a method for heat setting a molded plastic container. In this method, liquid carbon dioxide or liquid nitrogen is vaporized at slightly greater than atmospheric pressure, and is used to flush the container following the step wherein the container is held against the mold. The flush continues for a time after the container is removed from the mold. The stuffer rod construction contains a complex network of passages and orifices, and location of the cooling fluid orifices is critical to obtain uniform properties throughout the container. Although the process is intended to reduce the total cycle time, the Ajmera process still has considerably longer cycle times than cold blowing methods.

The known heat setting processes have several drawbacks. The first drawback is that the maximum practical hot filling temperature for the containers is about 90° C. Thus, the containers cannot be filled with boiling hot foods. A second drawback is that the improved thermomechanical properties obtained by known heat setting methods largely disappear within 72 hours of heat setting the container. The container must therefore be filled soon after heat setting, or unacceptable shrinkage of the container will occur during filling, just as occurs with a cold blown container. Yet another drawback is that conventional heat setting causes a substantial reduction in the container's ability to retain gases and moisture. The manufacturer is forced to choose between hot filling capability or good gas and moisture retention. Most beer is heat pasteurized before bottling, and requires a container that can be hot filled. Because of the relatively high rate of carbon dioxide permeation through conventional heat set PET bottles, beer is not presently packaged in molded plastic containers. The poor moisture retention of conventional heat set bottles forces producers of fruit juices to overfill their bottles to ensure that the quantity of product inside the container doesn't fall below the amount shown on the label due to evaporation through the bottle.

SUMMARY OF THE INVENTION

It is therefore an object of the invention to produce a biaxially oriented, heat set, molded plastic container having gas and moisture retention properties at least comparable to containers made by cold blowing processes. Another object is to produce a molded plastic container that is able to withstand a filling temperature of 100° C. without significant shrinkage or loss of strength of the container. A third object is that the total time required to practice the method be as short as possible, to allow production rate to be as high as possible. Yet another object of the invention is that the method of manufacturing the plastic container use equipment similar to existing methods for making plastic containers. Finally, an object is that the method require a minimum number of steps.

These objects are achieved by placing a preheated preform in a mold with heated walls, inserting a stuffer with a stretch rod into the preform, stretching the preform to the length of the cavity formed by the mold, expanding the preform against the mold with pressurized gas, holding pressure inside the preform for a predetermined time, followed by purging and cooling the interior of the molded preform with nitrogen gas at a temperature below −50° C.

and a pressure of at least 520 kPag, followed by releasing the final product from the heated mold. The total time the PET contacts the heated mold walls affects the amount of crystalline PET in the final product. The cold nitrogen cools the molded preform enough to keep the final product from sticking to the hot mold walls when released. The final product can be subjected to hot fill temperatures around 100° C. with less than a one percent change in linear dimensions. This hot filling capability remains substantially unchanged at least ninety days after heat setting. In addition, the final product made by the claimed process provides gas and moisture barriers at least comparable to cold blown containers. Since the method steps, and the apparatus used to implement them, are very similar to those already used in known molding techniques, retrofitting an existing production line requires a minimum of cost and new equipment. Finally, total cycle time is equivalent to that of cold molding methods and is considerably shorter than conventional heat setting method cycle times, allowing for high production rates.

These and other objects, advantages and features of this invention will be apparent from the following description taken with reference to the accompanying drawing, wherein is shown a preferred embodiment of the invention.

DESCRIPTION OF THE PREFERRED EMBODIMENT

In the following discussion, it should be appreciated that the figures and description of the apparatus used to practice the method are intended merely to functionally describe the apparatus, and not limit it to any particular configuration.

Figure 2:
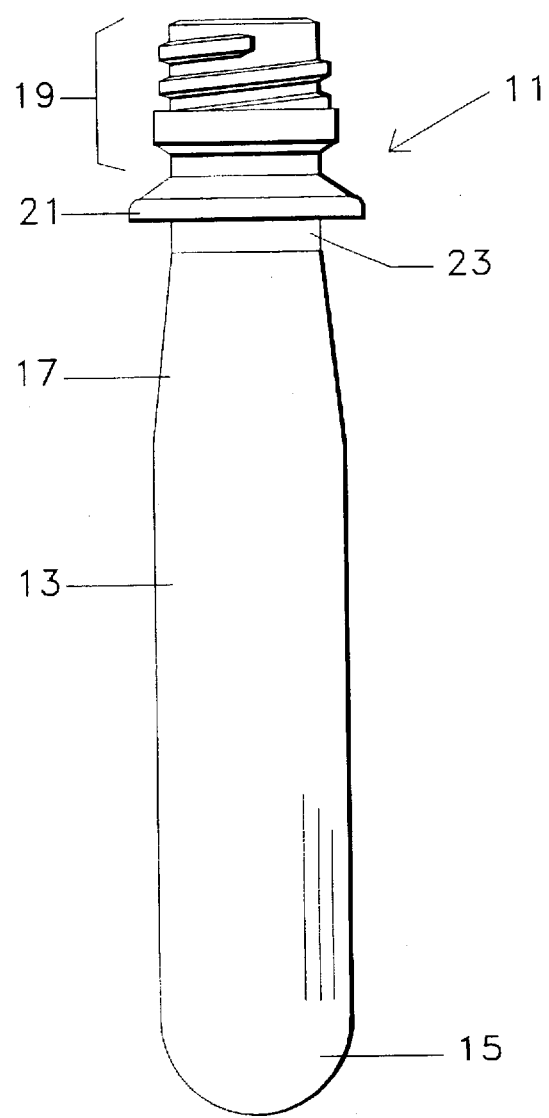
FIG. 2 is a side plan view of a typical plastic preform used in the method.

Referring now to the drawing, and in particular to FIG. 2, a typical preform 11 is shown. The preform 11 is made of polyethylene terephthalate, although other thermoplastic polymers having axially orientable molecular structures can be used. The preform 11 has a cylindrical body 13 with a round cap 15 and a tapered body section 17. The tapered body section 17 connects to the neck 19 via a bumper ring 21 and collar 23.

To begin the process, preform 11 is preheated in an oven (not shown) to soften it, according to methods known in the art. The preform 11 is then grasped around the collar 23 by a collet 25 that has a pair of jaws adapted to hold the collar 23 snugly and to provide a surface on which bumper ring 21 can rest. Collet 25 moves preform 11 to the next step, wherein preform 11 is placed into an opened split mold 26 made of two halves 27 and 29. The mold halves 27 and 29 are then closed around preform 11. The mold halves 27 and 29 are heated to a temperature preferably between 150° C. and 177° C. by oil circulating in channels 31 in the mold halves 27 and 29, or similar heating methods known in the art. Mold temperatures can be in the range of 130° C. to 232° C.; higher temperatures generally reduce the required time for heat setting.

Figure 1:
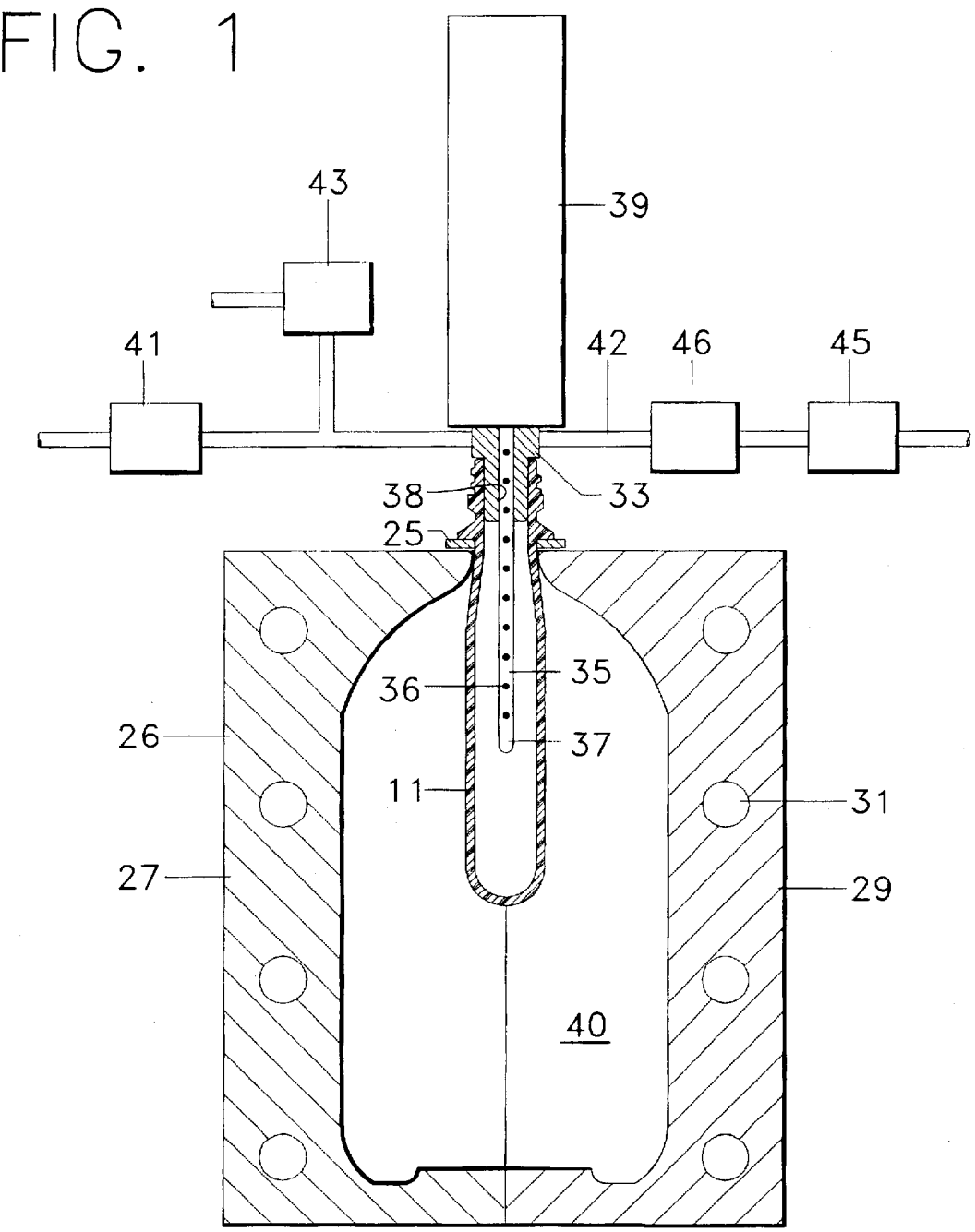
FIG. 1 is a diagrammatic, partially cross-sectional view of apparatus used in a method of making a molded plastic container according to the invention, prior to stretching the plastic preform.

In the next step, a stuffer 33 is inserted in preform neck 19 to hermetically seal preform 11, as shown in FIG. 1. A stretch rod 35 with a rounded tip 37 mates snugly with a hole 38 in the stuffer 33, forming an airtight seal. Both the stuffer 33 and stretch rod 35 have passages (not shown) for pressurizing and depressurizing the preform 11 with a gas. Openings 36 in the stretch rod 35 discharge the gas into the preform 11. The openings 36 are 1/16 inches (1.6 mm) in diameter, with a 45° counterbore with an outer diameter of 1/8 inch (3.2 mm), spaced one half to one inch (12 to 25 mm) apart along the length of the stretch rod. The counterbored openings 36 act as spray nozzles for dispersing the gas evenly through the preform 11. An actuator 39 is attached to the stretch rod 35 and the stuffer 33, and provides driving means to slide the rod 35 back and forth through the stuffer 33.

Figure 3:
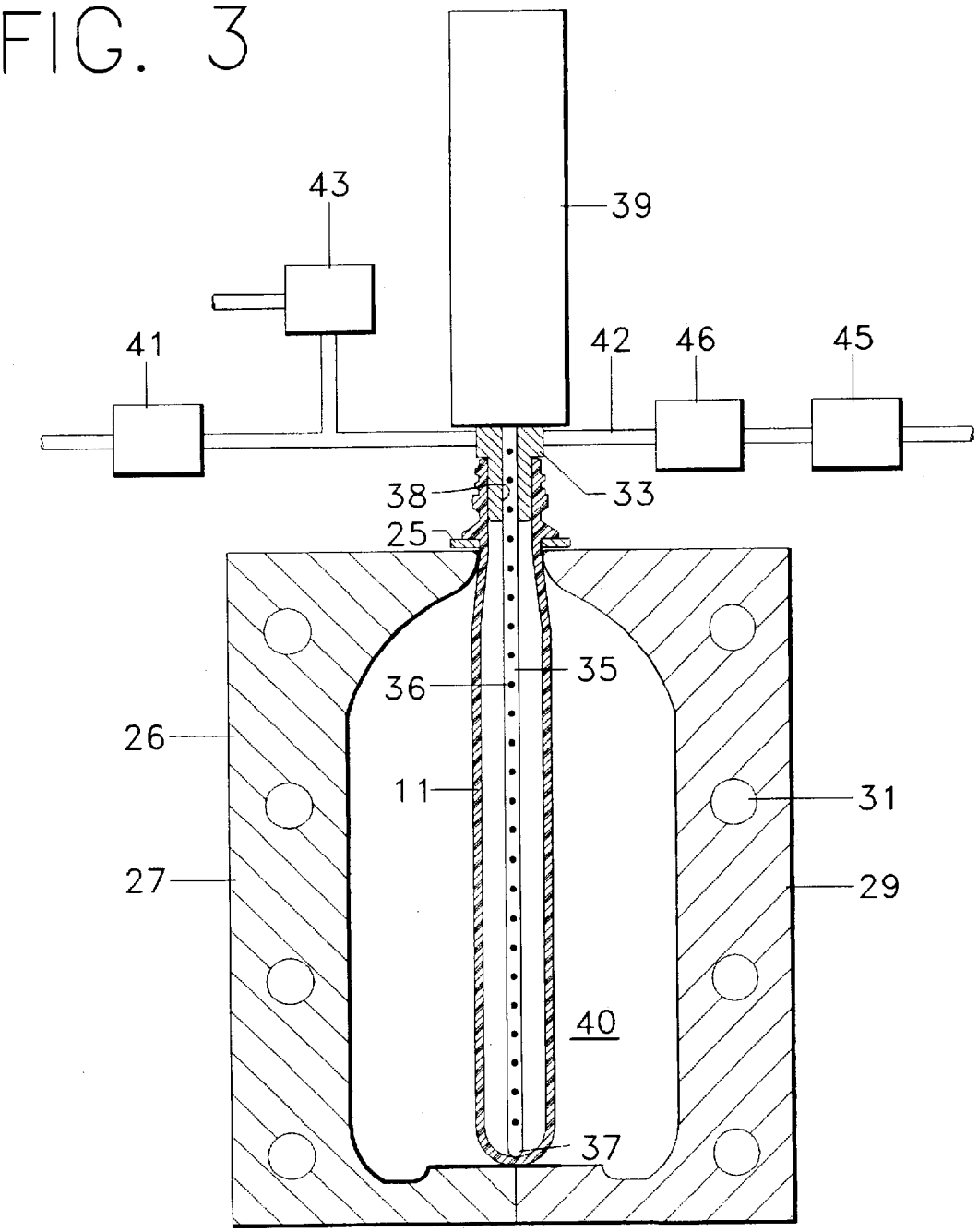
FIGS. 3 to 5 are views similar to FIG. 1 showing various stages in the method.

The actuator 39 extends the stretch rod 35 through the stuffer 33, during which the rod 35 engages the preform cap 15. As the rod 35 continues it travel, the preform 11 stretches until the cap 15 reaches the bottom of the cavity 40 formed by the mold walls 27 and 29, as shown in FIG. 3. An internal stop (not shown) in actuator 39 prevents further travel by the rod 35. This stretching action biaxially orients the thermoplastic. The biaxial orientation is predominantly responsible for the gas and moisture retention properties of the container.

Figure 4:
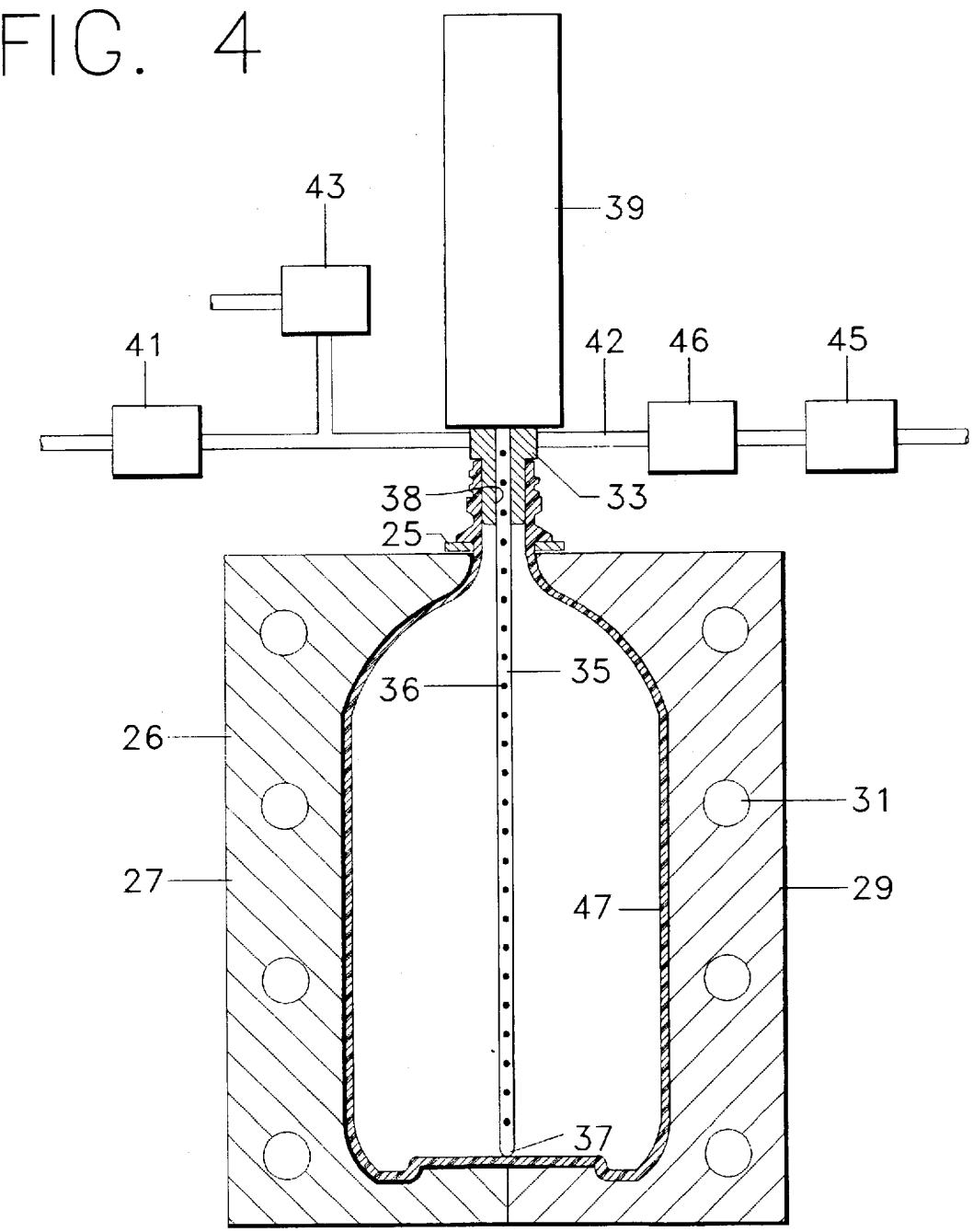
Figure 5:
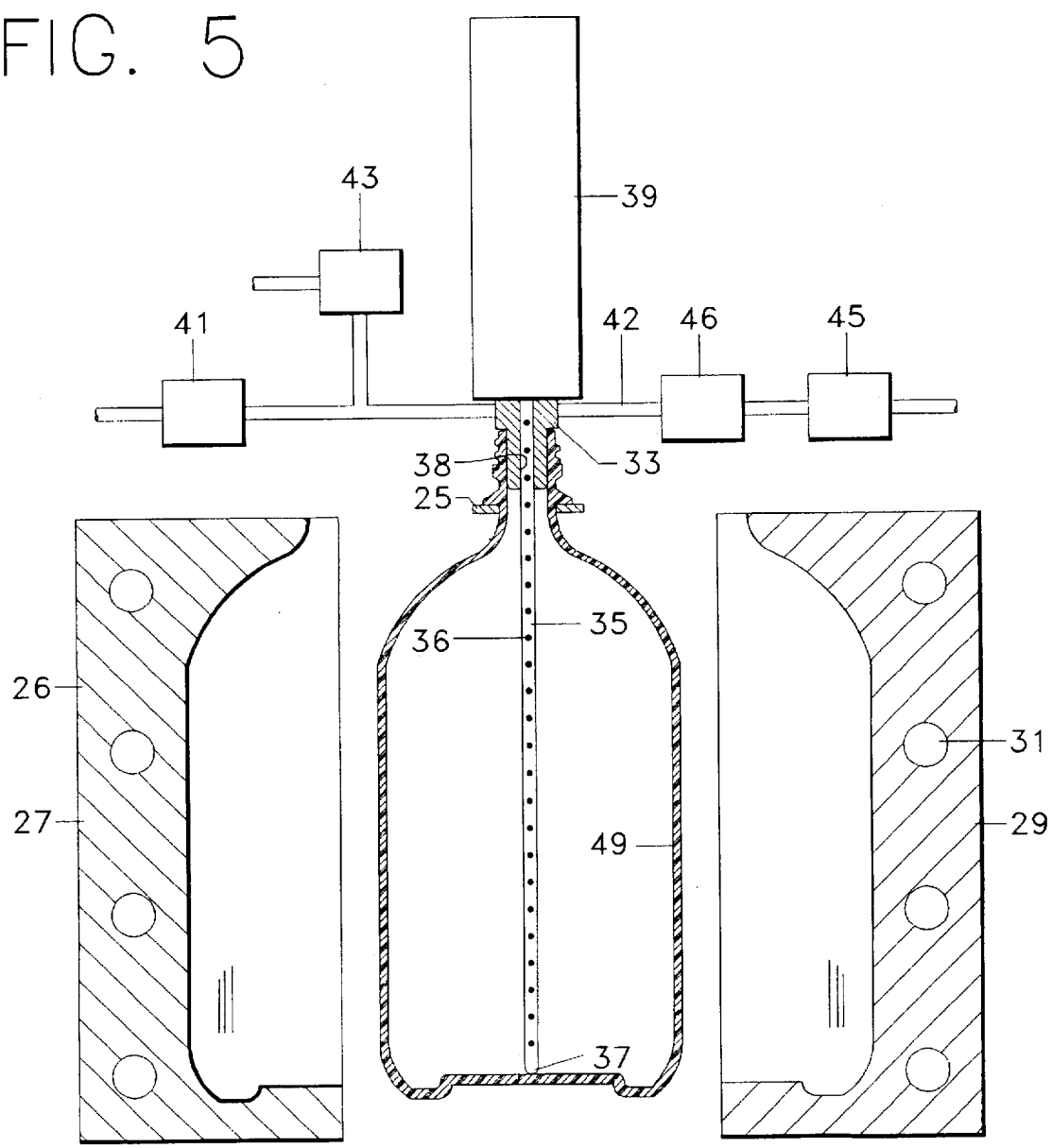

In the next step, a supply valve 41 is opened, and compressed air at about ambient temperature flows into the preform 11, causing the preform 11 to expand out and mold against the mold halves 27 and 29, as shown in FIG. 4. The air should be free of moisture, oil and foreign particles. It is believed that the degeneration of thermomechanical properties over time, that occurs in containers made with known heat setting processes, is predominantly due to absorption of moisture into the PET during conventional heat setting processes. Other dry, oil-free gases can be used, such as nitrogen. The step can be performed by using a low pressure air supply (not shown) to pre-blow the container, followed by blowing with a high pressure air supply (not shown) to complete the blowing and pressurizing of the molded preform 47. The supply valve 41 is opened for a total time of from about 0.3 seconds to about 0.8 seconds and then closed, although this time can be increased to vary the amount of heat setting. The vent valve 43 is then opened to vent the air.

A nitrogen supply valve 45 is opened at the same time or slightly after the high pressure air is supplied to the preform 11. A check valve 46 in the nitrogen supply line 42 is set below the pressure of the high pressure air. This keeps nitrogen from flowing through the nitrogen supply line 42 during this step. The use of the check valve 46 is preferred, as it simplifies design (no need for additional timers, etc.) and prevents accidental backflow of air into the nitrogen line 42, but is not required.

The next step in the method begins when the vent valve 43 opens and pressure in the molded preform 47 drops below the check valve 46 set point. When this occurs, nitrogen gas will immediately begin to flow through the nitrogen supply line 42 and into the molded preform 47. The nitrogen purges the air from the molded preform 47, cools the molded preform 47, and keeps the molded preform 47 pressurized. The nitrogen supply pressure is at least 690 kPa gauge (100 psig). Preferable supply pressure is 2070 to 3100 kPa gauge (300 to 450 psi gauge). Pressure inside the molded preform 47 must be maintained to at least 520 Kpag (75 psig) during this step to realize the improved hot filling and vapor/moisture barrier properties.

The nitrogen gas is created by vaporizing liquid nitrogen through a restriction (not shown), located upstream of the supply valve 45. As the nitrogen passes through the restriction, it vaporizes completely, producing nitrogen gas under pressure and at cryogenic temperatures, typically between −209° C. and −100° C. Nitrogen gas that has been cooled to a temperature below −50° C., and preferably to below −100° C., can also be used. The gas supply line 42 should be suitably insulated, if necessary, to keep the nitrogen gas within the desired temperature range when it enters the molded preform 47.

The vent valve 43 is held open for a total of about 1.3 to 1.5 seconds during this step. The nitrogen valve 45 is closed about 0.1 to 0.2 seconds before the step finishes. The total open time for the nitrogen valve 45, for a given degree of heat setting, varies inversely with the mold wall temperature. Longer total open time for a given temperature will result in greater heat setting. The vent valve 43 remains open through the next step in the method.

Flushing the interior of the molded preform 47 with pressurized, cryogenic nitrogen during this step affects the plastic. It appears that the molecular structure of the PET contacting the nitrogen is tightened, increasing the density of the PET. The nitrogen also appears to migrate into, and bond with, the PET in the molded preform 47. At the same time, the cryogenic nitrogen cools the PET rapidly, thereby annealing the PET. The combination of these mechanisms produces a container that has lower percentages of crystalline PET than conventional heat setting methods, yet can withstand higher hot filling temperatures. In addition, the container does not suffer any loss of the gas and moisture barrier properties that occurs from conventional heat setting methods. Flushing the container with nitrogen also removes acetaldehyde and other undesirable volatile components that are created during heat setting. These components can impart an unpleasant aftertaste to the container's contents.

In the last step of the method, the mold halves 27 and 29 are opened, the stuffer 33 and the related apparatus are removed, and the collet 25 moves the final product 49 on to another part of the manufacturing plant (not shown). The vent valve 43 is left open from the prior step, thereby depressurizing the final product 49 to atmospheric pressure before the stuffer 33 is removed. The delay time between closing the nitrogen valve 45 and opening the mold 26 is critical. Cooling ceases when the nitrogen valve 45 closes. The pressure holding the final product 49 against the mold 26 is also decreasing rapidly. Therefore, if the final product 49 is kept in contact with the mold 26 for longer than about 0.3 seconds, the container will overheat and shrink.

For heat setting processes known in the art, cooling of the mold 26 is often required to keep the final product 49 from sticking to the mold 26 during release. This is not necessary using the present method, because the cold nitrogen cools the final product 49 sufficiently to prevent sticking, even though the mold walls 27 and 29 remain heated. The mold halves 27 and 29 can thus be kept at the heat setting temperature at all times, reducing thermal cycling fatigue on the mold 26 and greatly reducing the process cycle time.

Bottles made using known heat setting processes often suffer from stress cracking in the base, in and around the area where the stretch rod 35 contacts the preform 11. The PET in this region crystallizes excessively due to excessive heating. The excessive heat in turn occurs due to repeated heating of the stretch rod by conductive heat transfer from one cycle to another, followed by incomplete cooling of the stretch rod. Stretch rod heat buildup and the associated stress cracking is avoided using the present method for two reasons. Firstly, the stretch rod heating time is greatly reduced from conventional methods, resulting in less heating of the stretch rod. Secondly, the nitrogen that cools the interior of the molded preform 47 also completely cools the stretch rod 35.

The use of vaporized liquid nitrogen also results in fewer defects in the final product 49. Because liquid nitrogen contains no significant amounts of moisture, dirt particles, or oil, as compressed air often does, imperfections caused by these contaminants is prevented. As previously discussed, it is believed that the absence of water in the nitrogen supply is a factor in creating containers that retain their thermomechanical properties for longer than 72 hours.

The following examples illustrate the claimed method and the improved properties of a container produced according to the claimed method.

EXAMPLE 1

A run of 200 test containers was prepared from 21 gram preforms designed to produce a 12 oz. (355 ml) bottle, using commercial grade amorphous PET having an intrinsic viscosity of 0.76 and density of 1.34 g/ml. For each test container, the preform was preheated to a temperature of about 195° F. (90° C.), and placed in a mold maintained at 285° F. (141° C.). The preform was stretched, then expanded by pressurizing with air at 90 psig (620 kPag) for 0.2 seconds, followed with air at 300 psig (2070 kPag) for 0.9 seconds. The nitrogen check valve was set at 290 psig (2000 kPag). A vent valve was opened, and vaporized nitrogen at about −200° C. was blown into the molded preform. The nitrogen was flushed through the container for 1.2 seconds, followed by a 0.2 second delay before opening the mold. Total time for the preform within the mold was less than 3 seconds.

For comparison, a run of 200 control containers were prepared using a cold blow molding method. The control containers were produced using identical preforms as those used to produce the test containers, and were molded to the same shape. Samples of both the control containers and the test containers were selected immediately after production, and tested for mechanical properties and hot filling performance at several temperatures. The hot filling performance tests were repeated on different samples 30 days after production.

Table 1 summarizes the results of the tests performed in the first 30 days after production. The overfill volume data is adjusted to 68° F. (20° C.).

TABLE 1

|  | Test Avg. (Day 1) | Test Avg. (30 days) | Control Avg. (Day 1) |
|---|---|---|---|
| 185° F./85° C. Overfill volume change, % | −0.753 | −1.255 | −20.905 |
| 195° F./91° C. Overfill volume change, % | −2.479 | −2.478 | −27.553 |
| 185° F./85° C. height change, % | −0.013 | −0.115 | −4.726 |
| 195° F./91° C. height change, % | −0.228 | −0.208 | −6.236 |

A test container was filled with hot oil at 230° F. (110° C.). The container's height reduction was less than one percent. Hot filling performance did not markedly deteriorate after 30 days. In fact, tests showed a slight improvement in hot filling performance for 195° F. (91° C.).

In addition, samples of both the control containers and the test containers were sent to Plastic Technologies Inc.'s laboratory in Holland, Ohio for testing. The laboratory tested mechanical properties, hot filling performance, crystallinity, density, and $CO_2$ barrier performance more than 90 days after production. The $CO_2$ barrier test was performed on a Permatran C IV permeation test device, and the containers were carbonated to a level of 3.8 volumes and held at 73° F. (23° C.). The test results are summarized in Table 2. Several bottles were also tested by PTI for $CO_2$ retention over a ten week period. The results are summarized in Table 3.

TABLE 2

|  | Control Sample | Test Sample |
| --- | --- | --- |
| Crystallinity (sidewall), % | 26.5 | 33.8 |
| Crystallinity (base), % | 20.8 | 30.9 |
| Density (sidewall), g/ml | 1.3647 | 1.3734 |
| Density (base), g/ml | 1.3579 | 1.3699 |
| 185° F. Capacity change, % | −7.11 | −0.055 |
| 195° F. Capacity change, % | −18.31 | −0.16 |
| 210° F. Capacity change, % | −34.97 | −0.25 |
| 185° F. Height change, % | −5.14 | −0.266 |
| 195° F. Height change, % | −6.32 | −0.423 |
| 210° F. Height change, % | −7.96 | −0.550 |
| $CO_2$ permeation rate, ml(STP)/day | 4.7 | 4.7 |

TABLE 3

|  | Control Sample | Test Sample |
| --- | --- | --- |
| initial $CO_2$, volumes | 4.70 | 4.70 |
| $CO_2$ at week 5, volumes |  | 3.78 |
| $CO_2$ at week 8, volumes |  | 3.73 |
| $CO_2$ at week 9, volumes |  | 3.43 |
| $CO_2$ at week 10, volumes | 3.23 | 3.23 |

The crystalline PET content of the test containers was lower than the content for known heat setting methods, which normally require about a 38% or higher crystalline PET content to ensure good hot fill performance. Despite the lower crystalline PET content, the test containers produced by the claimed method had improved hot filling performance over known methods.

EXAMPLE 2

A small run of test containers and control containers were prepared at the same time as the containers for Example 1. The containers were prepared from 19 gram preforms designed to produce a 12 oz. (355 ml) bottle, using commercial grade amorphous PET having an intrinsic viscosity of 0.76 and density of 1.34 g/ml. The containers were made using the same method as Example 1. The containers from this run were also tested for $CO_2$ retention by Plastic Technologies Inc.'s laboratory. The control samples started with 4.36 volumes of $CO_2$ and at the end of eight weeks the container held 3.09 volumes of $CO_2$. The test samples started with 4.36 volumes of $CO_2$ and at the end of eight weeks the container held 2.93 volumes of $CO_2$.

Another embodiment (not shown) is envisioned, for use in extruded mold blowing processes. In this embodiment, the "preform" is a tubular length of plastic, such as polypropylene or polyethylene, that is extruded into the mold. The plastic is extruded to the full length of the final product, and the open end of the preform is pinched shut by the bottom edge of the mold. Thus, there is no stretch rod 35 or a step wherein the stretch rod 35 stretches the preform 11 to the length of the final product 49. Except for these differences, the method is identical to that already described. The preform is blown into the mold, first by a short pre-blow utilizing a low pressure air supply, followed by pressurizing the molded preform with a high pressure air supply. The container is purged under a pressure of at least 520 kPag (75 psig) with cryogenic nitrogen, followed by depressurizing the container and releasing the final product from the mold. This process can be employed to make extruded objects in shapes other than containers.

An advantage of the claimed method for extruded blow molding is that polyethylene containers produced using the claimed method will accept ink printing on the outer surface. Extruded polyethylene containers produced by known methods require post-production treatment with an open flame on the outer surface of the container in order for ink to stick to the plastic's surface.

The claimed method can be adapted to produce improved thermoplastic material in any thin form, including but not limited to plastic in sheet and film form. Thin as used in this case is defined to mean thicknesses of up to one-quarter inches (6.4 mm). In such a process, one side of the thermoplastic material is contacted with a heated surface, such as a heated conveyer belt. The other side of the material would then be pressurized with gas at cryogenic temperatures as already discussed. The resulting plastic will have improved thermomechanical properties. In addition the gas and moisture barrier properties will not be substantially reduced from their values before practicing the claimed method.

From the foregoing it will be seen that this invention is well adapted to attain all of the ends and objectives hereinabove set forth, together with other advantages which are inherent to the apparatus.

It will be understood that certain features and sub combinations are of utility and may be employed without reference to other features and sub combinations. This is contemplated by and is within the scope of the claims.

As many possible embodiments may be made of the invention without departing from the scope thereof, it is to be understood that all matter herein set forth or shown in the figures of the accompanying drawings is to be interpreted as illustrative and not in a limiting sense.

I claim:

1. A method of making a molded plastic container from a preform made from polyethylene terephthalate, comprising the following steps:

a. preheating to soften the preform;

b. inserting the preform into a split mold whose walls are heated to a temperature in the range of 130° C. to 240° C.;

c. inserting a stuffer into the preform;

d. injecting a first gas into the preform, thereby expanding and molding the preform against the walls of the mold, and holding pressure in the molded preform for a predetermined time;

e. venting the first gas from the molded preform;

f. while venting, injecting vaporized nitrogen into the molded preform at a pressure of at least about 2070 kPa, the vaporized nitrogen entering the interior of the preform at a temperature below −100° C., and purging and cooling the molded preform with the vaporized nitrogen for a predetermined time, during which time the molded preform transforms into a final product; and g. releasing the final product from the mold.

2. A method of making a molded plastic container as in claim 1, wherein the first gas in step (d) is selected from the group consisting of compressed air and compressed nitrogen.

3. A method of making a molded plastic container as in claim 1, wherein the nitrogen is supplied by vaporizing liquid nitrogen across a restriction.

4. A method of making a molded plastic container as in claim 1, further comprising a stretch rod passing through a hole defined in the stuffer, the rod being capable of sliding within the stuffer and forming an airtight seal therewith.

5. A method of making a molded plastic container as in claim 4, further comprising the step, occurring between steps (c) and (d) in claim 1, of stretching the preform axially with the rod to the length of the final product.

* * * * *